US008081328B2

(12) United States Patent
Kudo

(10) Patent No.: US 8,081,328 B2
(45) Date of Patent: Dec. 20, 2011

(54) IMAGE FORMING APPARATUS

(75) Inventor: Tomoo Kudo, Koganei (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 934 days.

(21) Appl. No.: 12/053,649

(22) Filed: Mar. 24, 2008

(65) Prior Publication Data

US 2008/0278739 A1 Nov. 13, 2008

(30) Foreign Application Priority Data

May 8, 2007 (JP) ................................ 2007-123133

(51) Int. Cl.
*G06K 15/00* (2006.01)
*G06F 3/12* (2006.01)

(52) U.S. Cl. ..................................... 358/1.14; 358/1.15

(58) Field of Classification Search ................. 358/1.14, 358/1.15, 1.1, 1.7, 1.8, 1.9, 1.13, 1.16, 1.17, 358/1.18, 400, 401, 500, 501, 406, 407, 468, 358/404, 444; 399/1, 8, 9, 10, 11, 24, 25, 399/26, 27, 28, 29, 30, 37, 115, 119, 81, 399/88, 262; 347/2, 3, 5, 14, 23; 219/665
See application file for complete search history.

(56) References Cited

U.S. PATENT DOCUMENTS

| | | | | |
|---|---|---|---|---|
| 5,706,411 | A * | 1/1998 | McCormick et al. | 358/1.14 |
| 5,734,804 | A * | 3/1998 | Bergner | 358/1.14 |
| 2003/0230568 | A1* | 12/2003 | Yamanaka | 219/665 |
| 2006/0216619 | A1* | 9/2006 | Iwasaki et al. | 430/58.75 |
| 2007/0237537 | A1* | 10/2007 | Hasegawa et al. | 399/81 |
| 2010/0329704 | A1* | 12/2010 | Tachibana | 399/27 |
| 2011/0052218 | A1* | 3/2011 | Arai | 399/11 |

FOREIGN PATENT DOCUMENTS

| | | | |
|---|---|---|---|
| JP | 7-1790 | | 1/1995 |
| JP | 2004082534 A | * | 3/2004 |

* cited by examiner

*Primary Examiner* — Dov Popovici
(74) *Attorney, Agent, or Firm* — Finnegan, Henderson, Farabow, Garrett & Dunner, L.L.P.

(57) ABSTRACT

An image forming apparatus having: a replacement part that can be replaced; an operation and display section; an image forming section that forms an image on a sheet; a power supply section that supplies power to the image forming section; a storage section that stores a procedure of replacing the replacement part; and a control section, wherein the control section carries out, upon input instruction of the replacement part to be replaced from the operation and display section, a display operation of the replacement procedure of the replacement part on the operation and display section and an ON/OFF control of the power supply section.

4 Claims, 10 Drawing Sheets

IMAGE FORMING APPARATUS

RELATED APPLICATION

This application is based on Japanese Patent Application No. 2007-123133 filed on May 8, 2007 in Japan Patent Office, the entire content of which is hereby incorporated by reference.

BACKGROUND

The present invention relates to image forming apparatuses having parts that can be replaced.

An image forming apparatus has a large number of replacement parts and, conventionally, a service engineer was carrying out the work of replacing the replacement parts. The service engineers would have received some training in advance related to replacement of the replacement parts, and were carrying out replacement according to the replacement procedure given in an instruction manual related to parts replacement.

In the Unexamined Japanese Patent Application Publication No. Hei 7-1790, an information processing apparatus with a built in printer has been disclosed that makes an instruction manual unnecessary by inputting the fact that not a service engineer but the user replaces replacement parts, and by outputting voice guidance in accordance or displaying the guidance information in the screen according to that input.

Conventionally, since a service engineer was replacing the replacement parts of image forming apparatuses, very often it was not possible to use the image forming apparatus until the service engineer arrived. In that case, there would be down time of the machine and the rate of operation had decreased. In addition, it was necessary to consider in advance the cost of a service engineering visiting the site of the machine as a necessary expense, and because of this there was the problem that generally the running cost increased.

As a countermeasure for these problems, making it possible for the user to carry out the replacement was considered as a method of solving the problems, and for this, it was necessary to provide means that make replacement easy. In the information processing apparatus with a built-in printer described in the Unexamined Japanese Patent Application Publication No. Hei 7-1790, although there is the effect that the instruction manual becomes unnecessary, the effect was insufficient for the problem of making replacement easy.

The present invention was made considering the above problems, and the purpose of the present invention is to provide an image forming apparatus in which it is possible for the user et al. to carry out easily replacement of replacement parts without having to obtain the help of a service engineer who has received training related to the replacement of parts.

SUMMARY

1. According to one aspect of the present invention there is provided an image forming apparatus comprising: a replacement part that can be replaced; an operation and display section; an image forming section that forms an image on a sheet; a power supply section that supplies power to said image forming section; a storage section that stores a procedure of replacing said replacement part; and a control section, wherein said control section carries out, upon input instruction of said replacement part to be replaced from said operation and display section, a display operation of the replacement procedure of said replacement part on said operation and display section and an ON/OFF control of said power supply section.

Although the present invention is described below based on a preferred embodiment, the present invention shall not be construed to be limited to the preferred embodiment.

Figure 1:
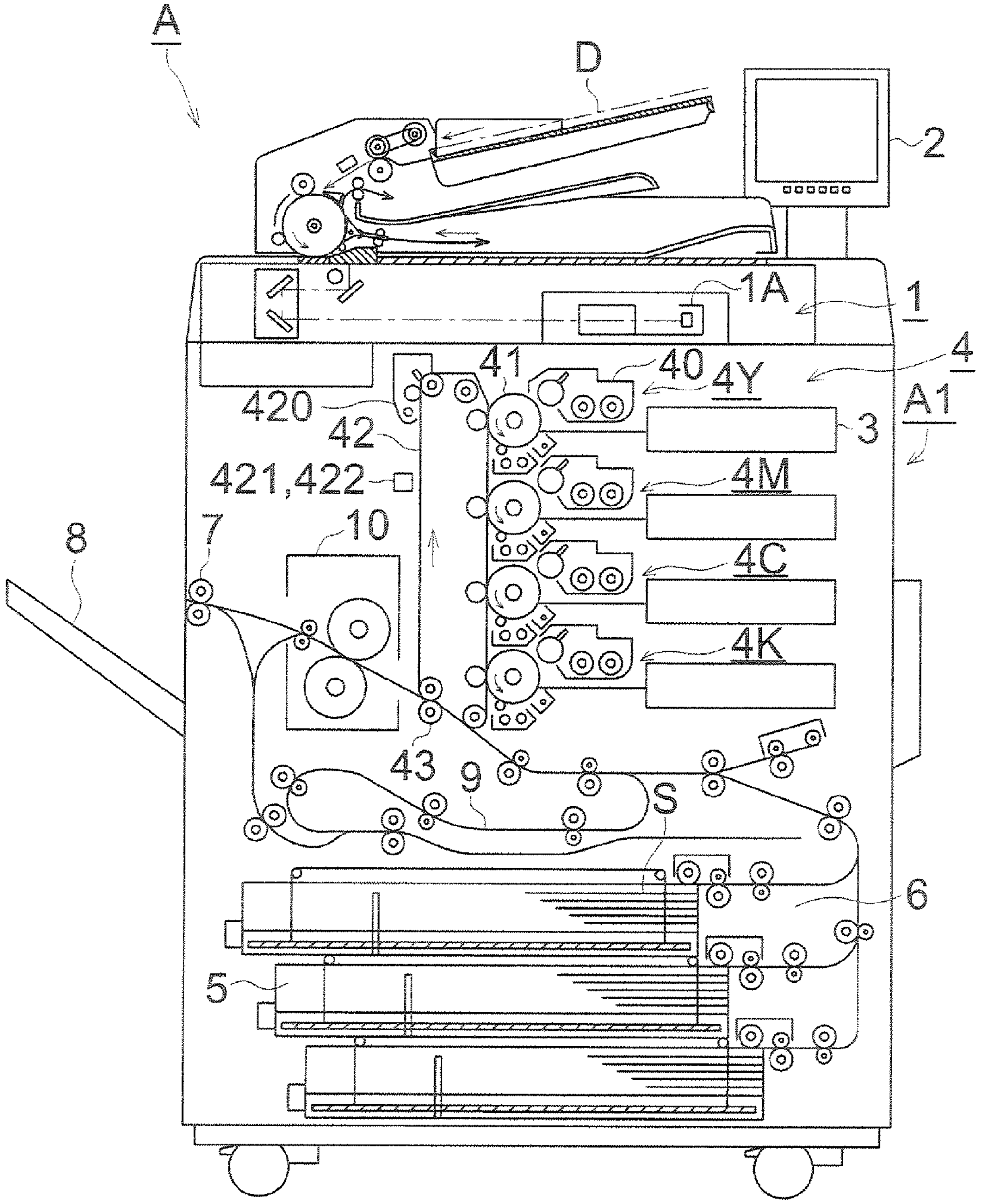
FIG. 1 is a central cross-sectional view diagram of an image forming apparatus according to the present preferred embodiment.

FIG. 1 is a central cross-sectional view diagram of an image forming apparatus according to the present preferred embodiment. The image forming apparatus A is one that is called a tandem type color image forming apparatus, and has an image forming section A1, an original document erasing section 1, an operation and display section 2, and an automatic document feeder D.

The image forming section A1 has an image writing section 3, a plurality of image creating sections 4Y (Yellow), 4M (Magenta), 4C (Cyan), and 4K (Black), a belt shaped intermediate image transfer belt 42, sheet feeding cassettes 5, a sheet feeding section 6, a sheet discharge section 7, a double side conveying path 9, and a fixing apparatus 10.

The image creating sections (4Y, 4M, 4C, and 4K) have developing sections 40 which respectively store in them two component developing agents composed of a small particle diameter toner of the different colors of yellow (Y), magenta (M), cyan (C), and black (K), and carrier.

An automatic document feeder D is placed on top of the image forming apparatus. The original document placed on the document table of the document feeder D is conveyed in the direction of the arrow, and the image of one side or of both sides of the document is focused on the reading surface of the CCD image sensor 1A by the optical system of the document reading section 1.

The analog signal obtained by photoelectric conversion by the CCD image sensor 1A of the image focused on this reading surface is sent to the image writing section 3 after it is subjected to analog signal processing, A/D conversion, shading correction, image compression processing, etc., in the memory control section.

The image writing section 3 (the reference numbers are omitted for M, C, and K, and similarly also omitted for 40 and 41 below) forms a latent image by impinging the output light from a semiconductor laser on the photoreceptor 41 of the image creating section 4. The processings of charging, exposure, development, transfer, separation, and cleaning, etc., are carried out in the image creating section 4. The toner images of different colors created in the image creating sections 4 are successively transferred on to rotating intermediate image transfer belt 42 in a primary transfer process, thereby forming a synthesized color image.

The toner image on the intermediate image transfer belt 42 is transferred by the secondary transfer section 43 on to a sheet S conveyed from the sheet feeding cassette 5 by the sheet conveying section 6. The sheet S carrying the toner image is fixed by the application of heat and pressure in the fixing apparatus 10, and is discharged to outside the apparatus by the sheet discharging section 7 and placed on the sheet discharge tray 8.

9 denotes a double side conveying path. When forming images on both sides of the sheet S, the sheet S after image formation on its front surface and fixing by the fixing apparatus 10 is conveyed to the double side conveying path 9, front to back inverted by the switch back path and is again conveyed to the secondary image transfer section 43, and after image formation on the back surface, it is discharged to outside the apparatus by the sheet discharging section 7 and placed on the sheet discharge tray 8.

Although full color image is formed by successively superimposing toner image of four colors on the intermediate image transfer belt 42, color registration adjustment is carried out in order to align the toner image formation positions of the different colors. 421 are registration sensors constituted from reflection type photo sensors which detect the positions of the different color toner images formed at prescribed timings on the intermediate image transfer belt 42. In registration adjustment the positions of toner image formations are matched between the different colors by reading out the positions of V shaped detection patterns formed on the intermediate image transfer belt 42 by making two line images intersect each other at a prescribed angle. Further, the registration sensors 421 are placed at the left and right along the width direction of the intermediate image transfer belt 42 so that they constitute a pair. By configuring in this manner, the horizontal magnification and inclination are adjusted together based on the image position information read out from these two registration sensors 421.

422 are patch detection sensors constituted from reflection type photo sensors and detect the optical reflection density of the toner patch images of different colors formed on the intermediate image transfer belt 42. The image density of different colors is adjusted by changing the development bias or the laser output of the image writing section 3 based on the detection by the patch detection sensors.

Further, the residual toner remaining on the intermediate image transfer belt 42 after transferring the full color toner image on to the sheet S is removed by the belt cleaning section 420. This belt cleaning section 420 and the intermediate image transfer belt 42 together constitute the transfer belt unit.

Figure 2:
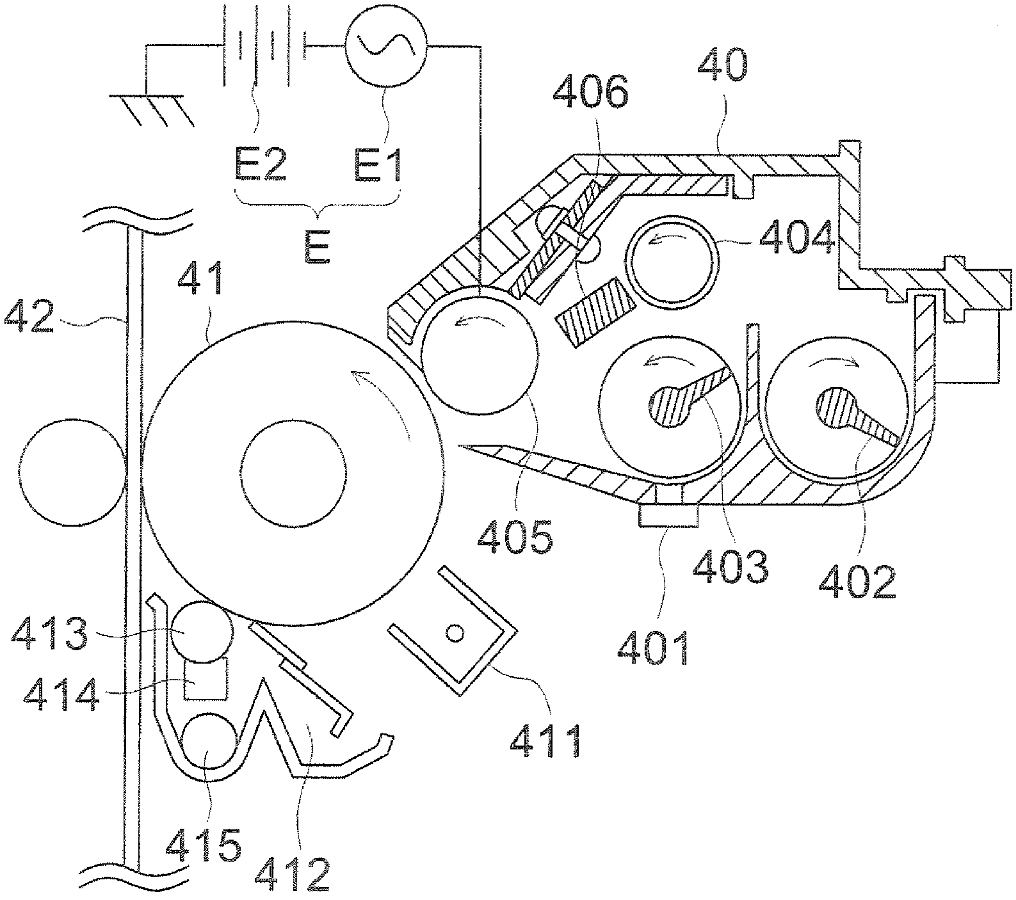
FIG. 2 is an enlarged view diagram of the surroundings of the developing device 40 and the photoreceptor 41.

FIG. 2 is an enlarged view diagram of the surroundings of the developing device 40 and the photoreceptor 41. A development roller 405, a developing agent stirring and conveying members 403 and 402, a developing agent supplying roller 404, a developing agent guiding member 406, etc., are placed in the developing device 40.

The development roller 405 is made up of a rotatable outer surface (called the development sleeve) and a magnetic field generating section (magnet roller) fixed in its inside.

The development roller 405 is placed opposite the photoreceptor drums 41 that carry the electrostatic latent image, and is rotationally driven by a driving source not shown in the figure. A development bias power supply E is connected to the development sleeve, and an AC voltage from the AC power supply E1 of the high voltage power supply E superimposed on a DC voltage from the DC power supply E2 is applied as the development bias.

The toner density detection sensors 401 are used for stabilizing the mixing ratio of the toner and carrier of the two component developing agent stored in the developing sections 40 at the prescribed value. The toner density detection sensors 401 of the magnetic permeability detection method outputs a characteristic based on the magnetic permeability of the developing agent (carrier) which is the measured material as, for example, a voltage value. Normally, the output value will be low when the toner density is high, and the output value becomes high when the toner density is low. In this manner, it is possible to know the toner density from the output value of a toner density detection sensor of the magnetic permeability detection method. In accordance with the detected toner density, toner is replenished from a toner supplying unit not shown in the figure.

In FIG. 2, 411 is a charging electrode for charging the photoreceptor drums 41. 412 is the photoreceptor cleaning member 412 that cleans the toner on the photoreceptor after transferring, and the scraped off toner is discharged to the waste toner storage section by the recovering screw 415. Also, 414 is a rod shaped lubricating material which is coated on the surface of the photoreceptor 41 by the lubricant coating roller 413. These photoreceptor cleaning member 412, lubricant coating roller 413, lubricating material 414, and the recovering screw 415 constitute the photoreceptor cartridge.

Figure 3:
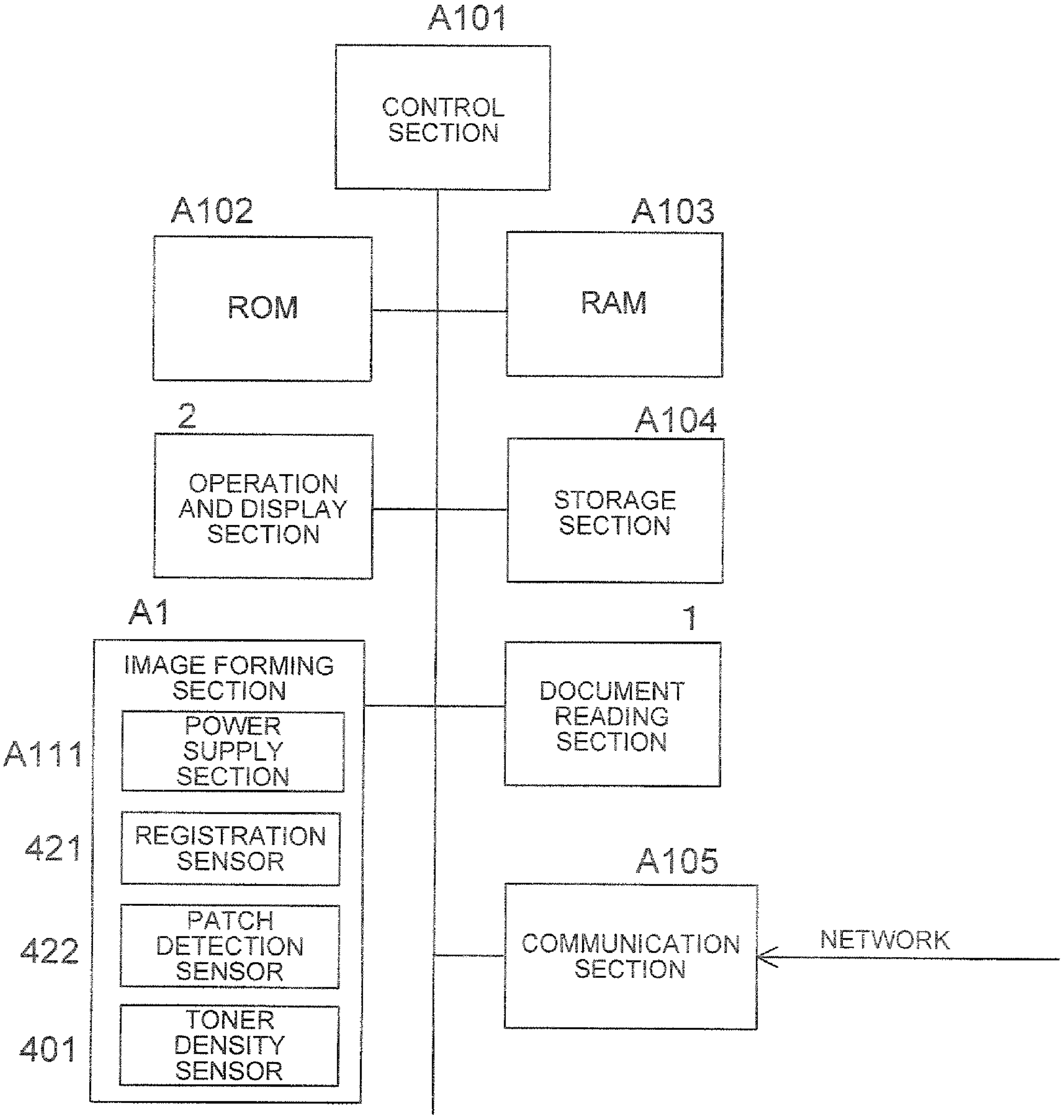
FIG. 3 is a control block diagram of the image forming apparatus.

FIG. 3 is a control block diagram of the image forming apparatus. Further, in FIG. 3, the entries have been made around the parts that are necessary for explaining the operation of the present preferred embodiment, and apart from that, the parts that are well known as parts of an image forming system have not been shown.

A101 is a CPU that functions as the control section that executes the different types of controls of the image forming apparatus A according to the programs. A102 is a ROM that stores various types of programs and data including the programs and data for controlling the image forming apparatus A. A103 is a RAM which is used as the work area by the CPU A101, and stores temporarily the program or data necessary when the CPU (A101) executes control of the image forming apparatus A or stores a print job.

Next, the CPU (A101) functions as a control section and executes the control of the image forming apparatus A based on the programs, data, and print jobs loaded into the RAM A103. A105 is the communication section that communicates via a network such as a LAN, etc.

The operation and display section 2 is provided with a touch panel which is a touch screen placed over a display section made up of a liquid crystal display. Using the operation and display section 2, it is possible to display various types of operation screens and replacement procedures, and to input the selection of replacement part, etc. Further, although the explanation has been given here of an example in which the touch panel functions as an operation section, it is not necessary to restrict to this but a keyboard, mouse not shown in the figure can also function as the operation section.

A104 is a storage section which is made up of an HDD (hard disk drive), and stores the usage history of a plurality of replacement parts respectively, the image data for giving instructions of the replacement procedure of replacement parts, or document data.

Power is supplied to the image forming section A1 from the power supply section A111. By controlling the power supply section A111, the control section can carry out the ON/OFF control of the power supply to the different sections of the image forming section A1 while maintaining the power supply to the control section and the operation and display section 2 of the image forming apparatus A.

Figure 4:
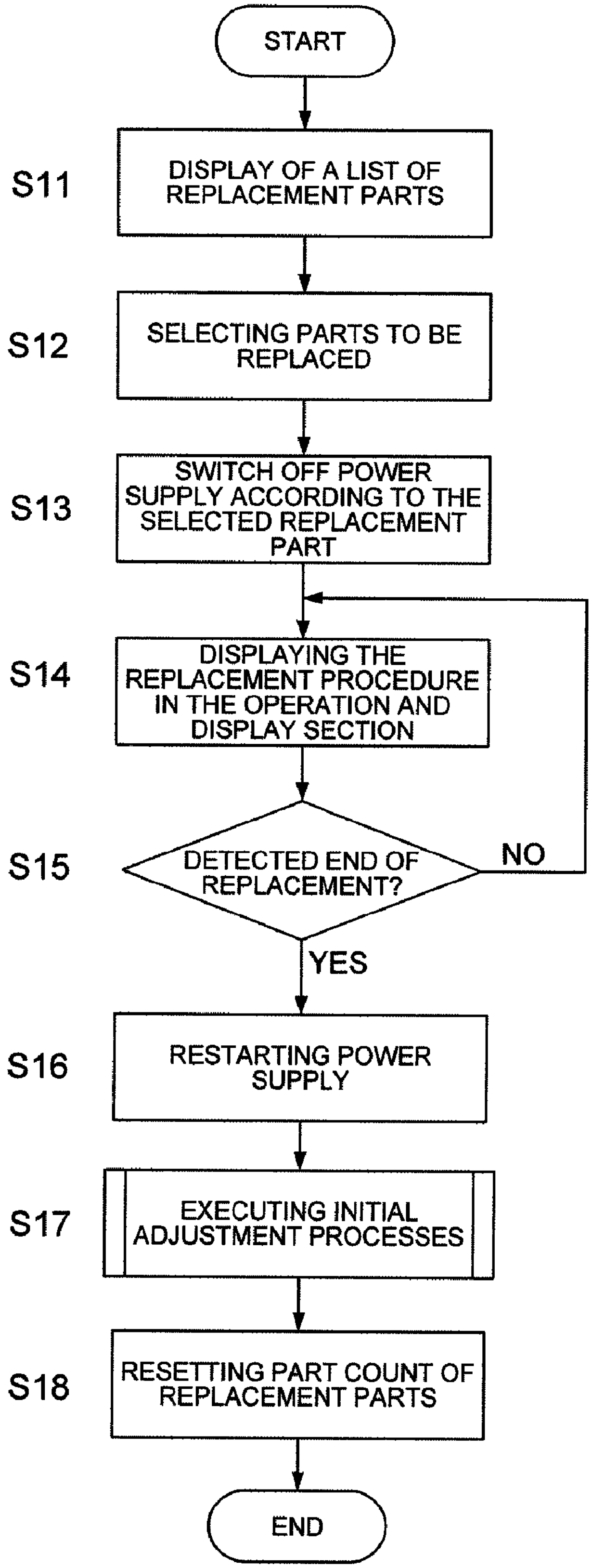
FIG. 4 is a diagram showing the control flow of the image forming system related to the present preferred embodiment.
Figure 5:
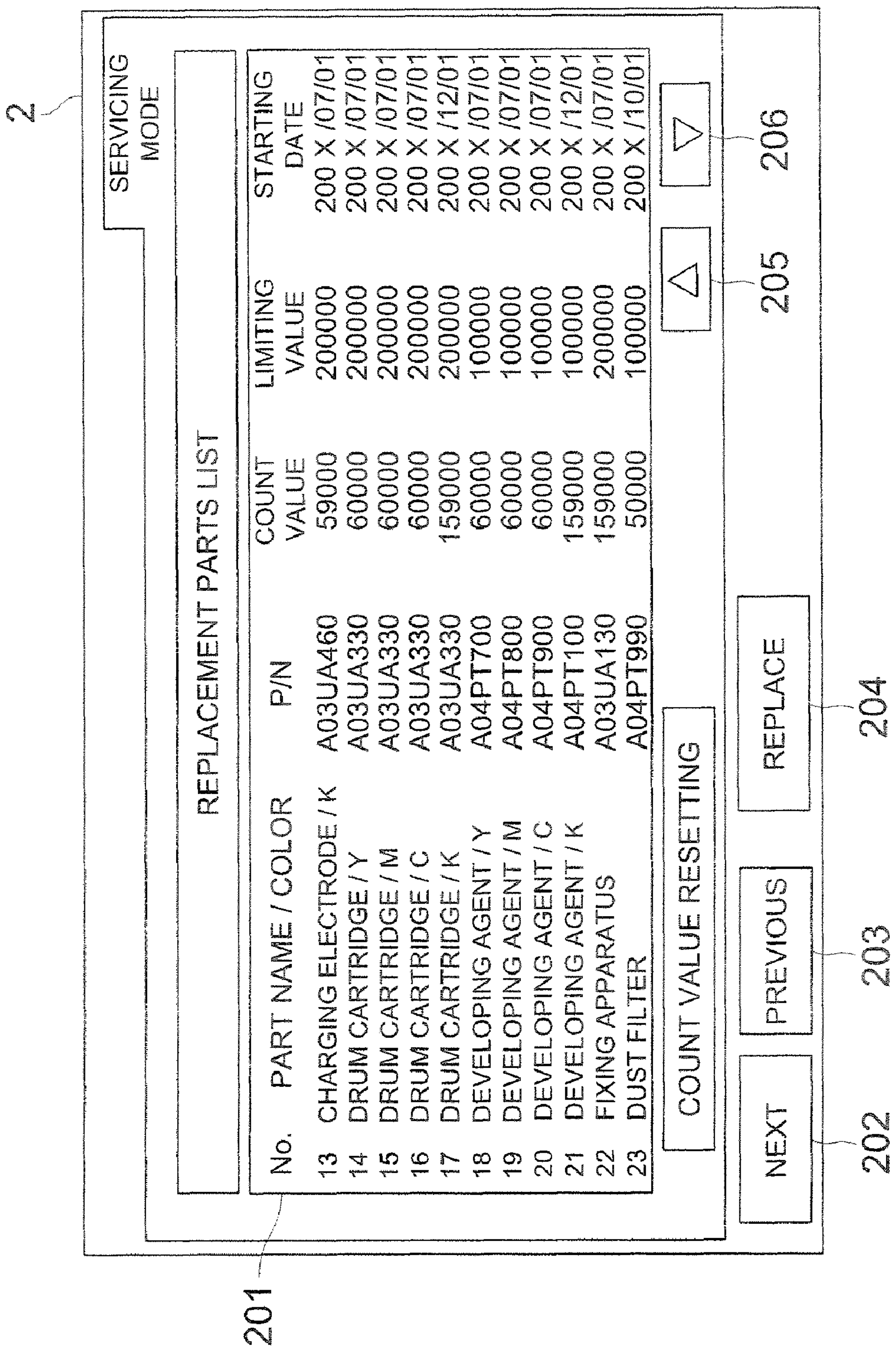
FIG. 5 is a detailed diagram of the display screen in the operation and display section 2.

FIG. 4 is a diagram showing the control flow of the image forming system related to the present preferred embodiment. Firstly, in Step S11, a list of replacement parts is displayed. FIG. 5 is a detailed diagram of the display screen in the operation and display section 2. A list of the replacement parts is displayed in 201. In this screen, the user gives and input instruction (selection) of the part to be replaced by pressing down the part where the part to be replaced is being displayed in the touch panel.

It is possible to select a plurality of parts to be replaced. In the example shown in FIG. 5, the state shown is one in which the drum cartridges Y, M, C, and K and the charger K have been selected. The selection of the replacement parts is ended when the user presses the replacement button 204 in this condition (Step S12).

The power supply switches are made OFF in accordance with the replacement parts selected in Step S12. This is done by the control section controlling the power supply section A111. When the replacement part is a drum cartridge, power supplies related to the image forming section A1 are switched OFF, such as the power supplies to each of the charging electrode 411, image writing section 3, development bias power supply E, and the different driving motors (Step S13).

Figure 6:
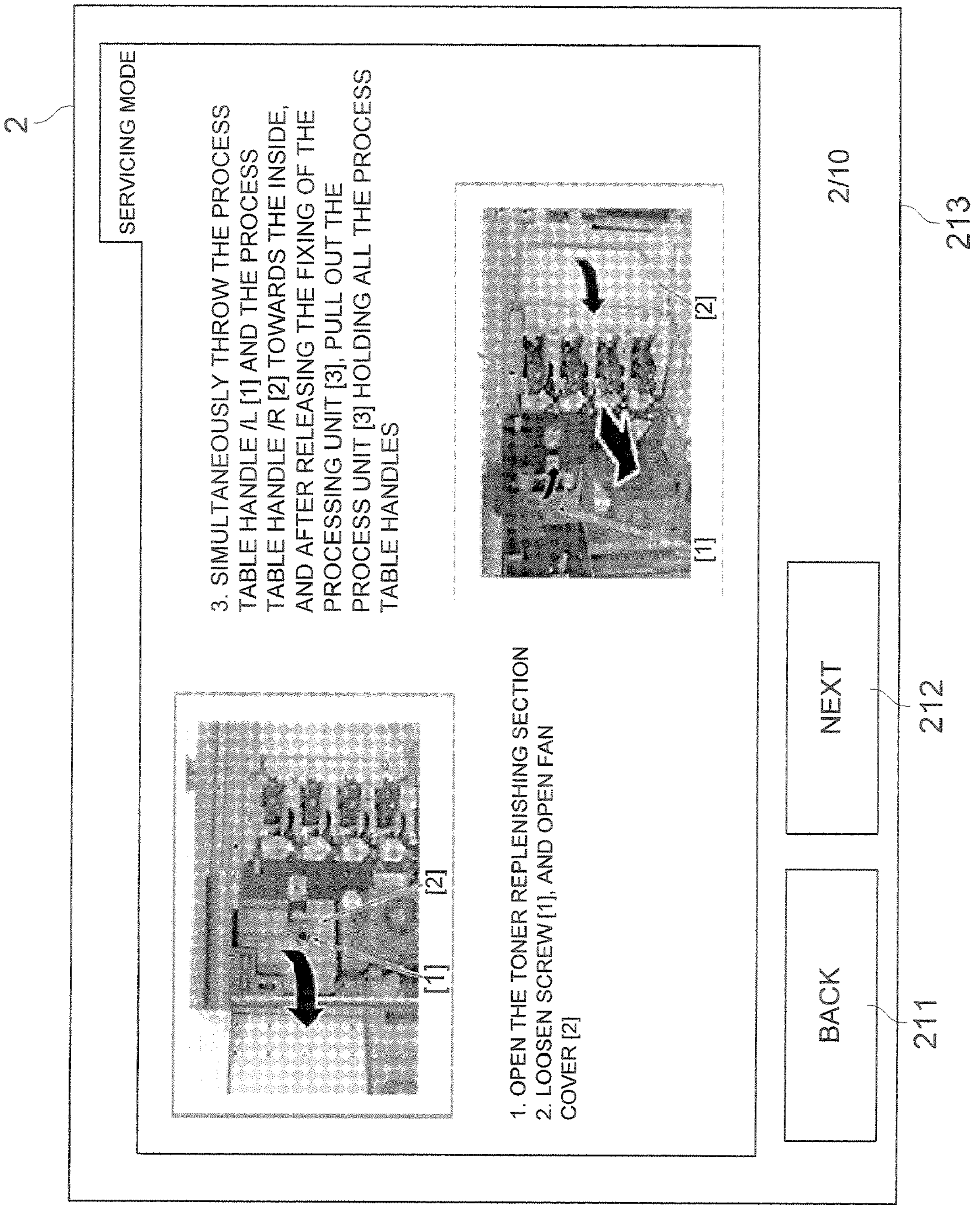
FIG. 6 is an example of displaying the replacement procedure in the operation and display section 2.
Figure 7:
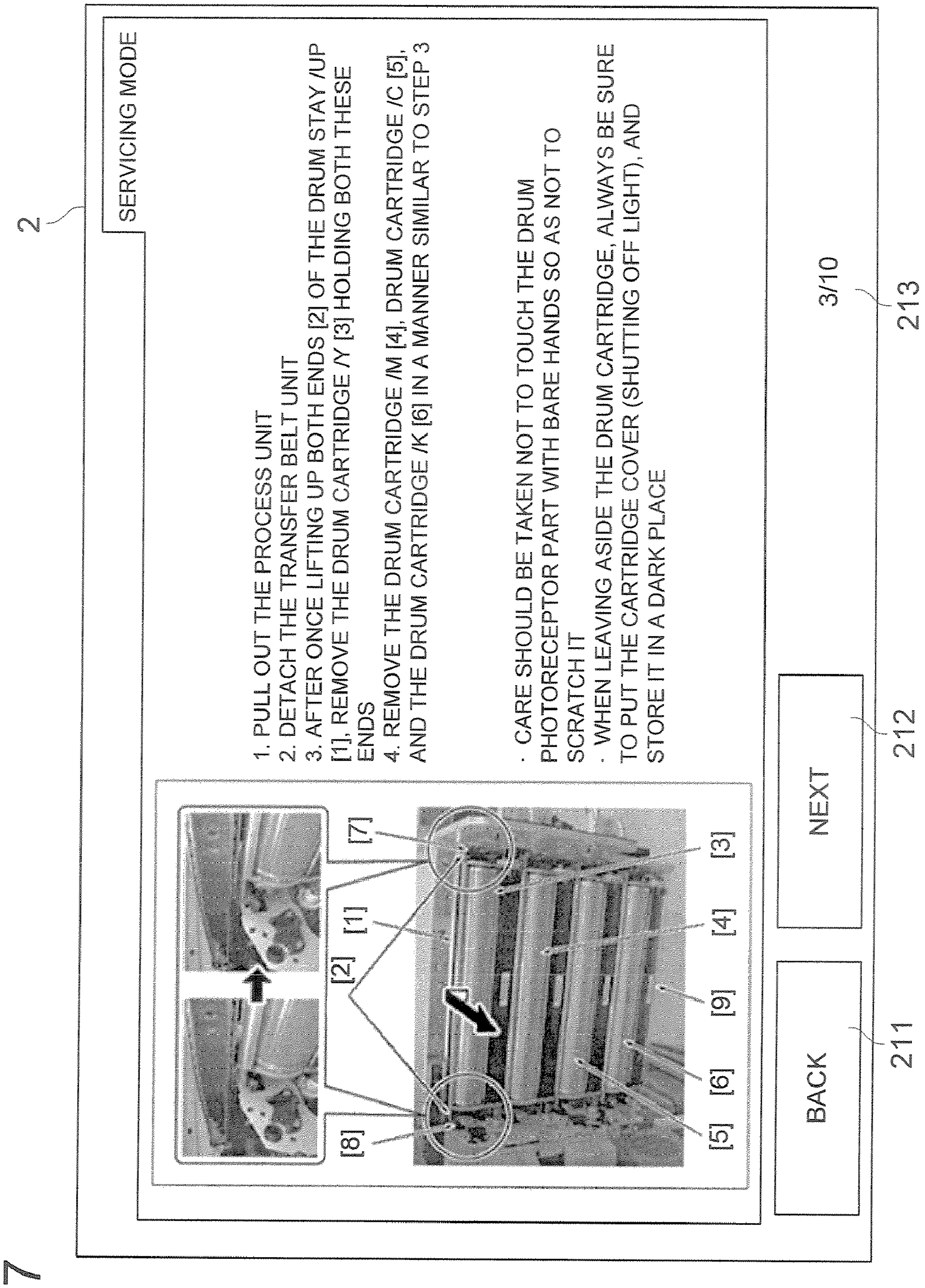
FIG. 7 is an example of displaying the replacement procedure in the operation and display section 2.

Next, in Step S14, the replacement procedure is displayed in the operation and display section. FIG. 6 and FIG. 7 are examples of displaying the replacement procedure in the operation and display section 2. These figures each show a part of the procedure at the time of replacing the drum cartridge (photoreceptor cartridge).

In the procedure display screen shown in FIG. 6 and FIG. 7, image data showing the configuration surrounding the replacement part, and text data giving the replacement procedure and the precautions to be taken during replacement are displayed. These data would have been stored in advance in the storage section A101. It is possible to change the currently displayed screen to the previous or the next pages by pressing the "Back" button 211 or the "Next" button 212.

Figure 8:
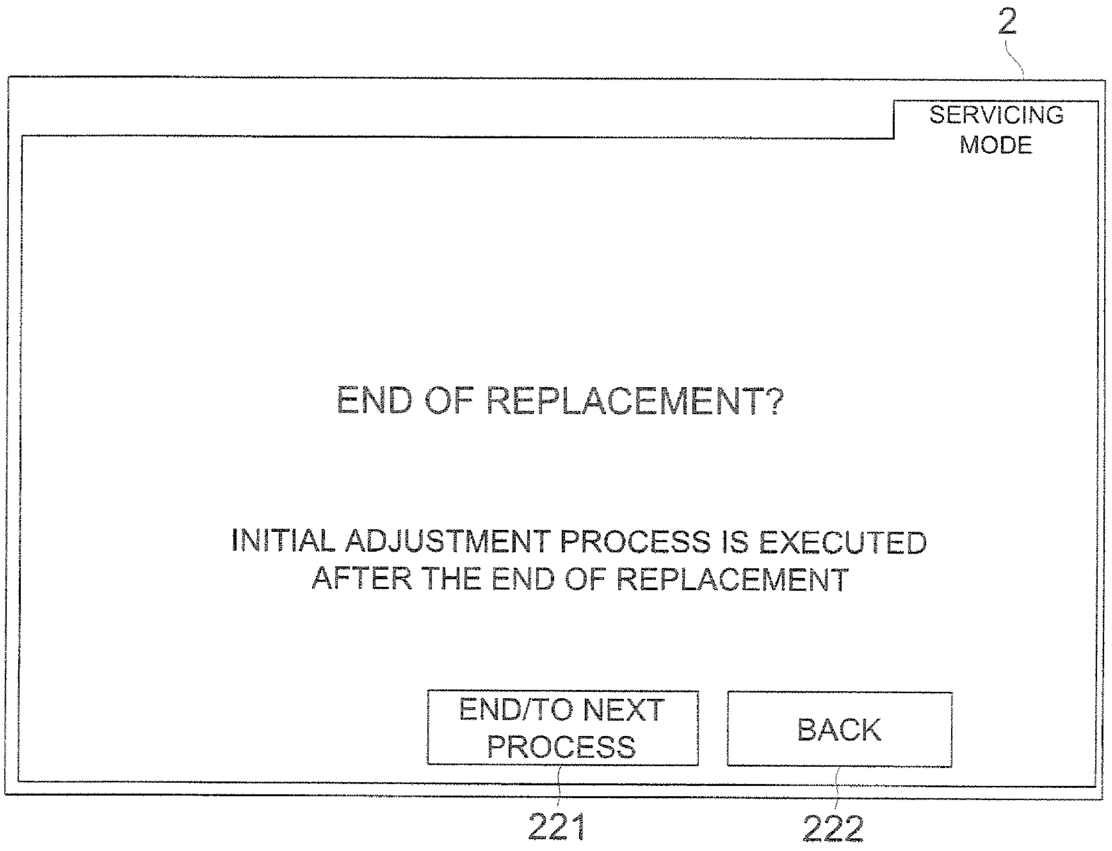
FIG. 8 is an example of displaying the end confirmation screen in the operation and display section 2.

FIG. 8 is an example of displaying the end confirmation screen in the operation and display section 2. The fact that the replacement of replacement parts has been completed is input (Step S15) by pressing the "End/Next step" button 221 in the confirmation screen shown in this figure. When this input is made, a judging section of the control section detects and judges that the replacement of replacement parts has been completed. Further, it is possible to provide actuator type sensors in the doors that are opened and closed along with replacement of replacement parts, and based on the outputs of these sensors it is possible to detect that the replacement part has been installed in the prescribed position and the open/close door has been closed, and to detect (judge) that the replacement of replacement parts has been completed by the detection of this door having been closed.

In Step S16, the control section resumes the power supply (switches ON) by controlling the power supply section A111.

Figure 9:
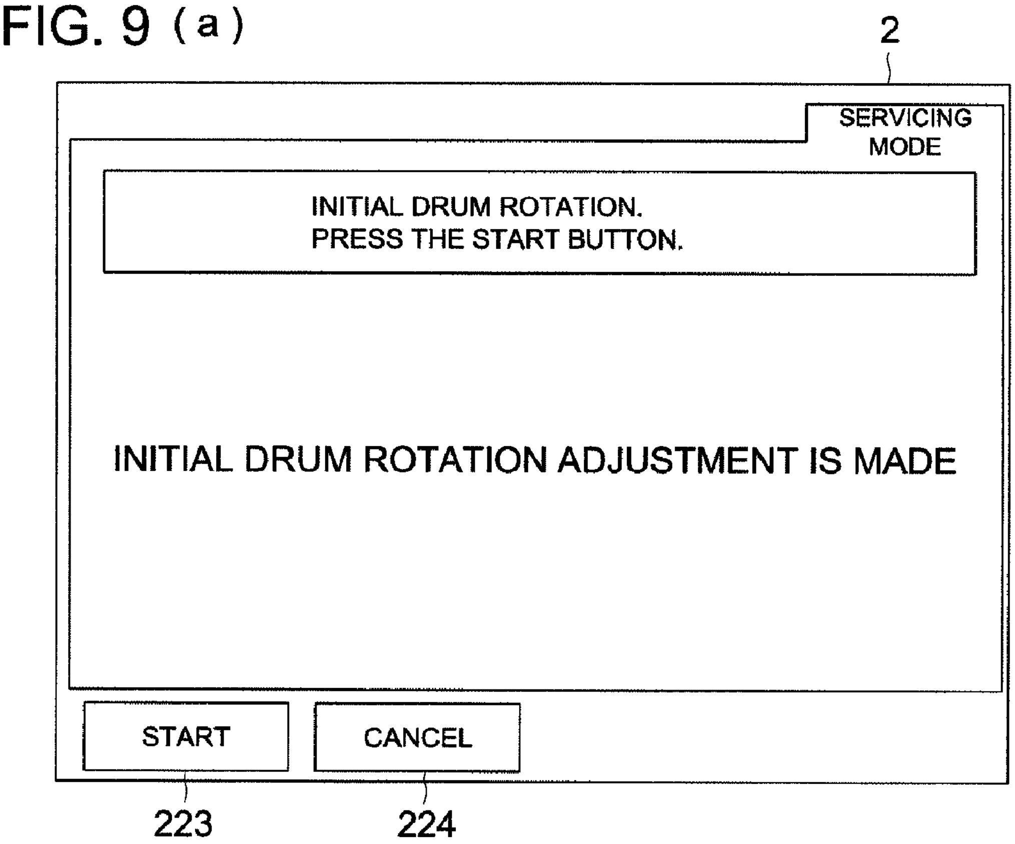
FIG. 9(*a*) and FIG. 9(*b*) are examples of displaying the confirmation screen of executing the initial adjustment process in the operation and display section 2.
Figure 9:
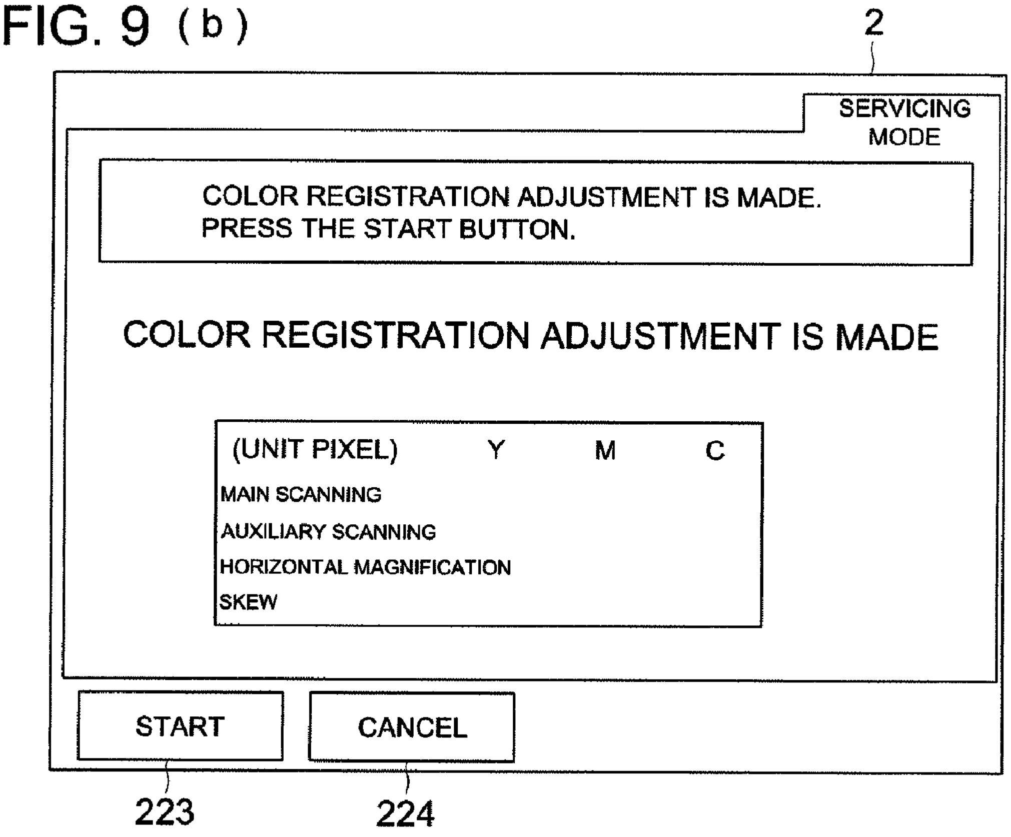

In Step S17, the initial adjustment process (initialization process) is executed that is associated with the replacement of replacement parts carried out by the user in Step 14. The "initial adjustment process" is the aging process, output adjustment process, etc., that are carried out at the time of initial use, and varies depending on the replacement part. When carrying out the initial adjustment process, for example, since a confirmation screen for carrying out "initial drum rotation adjustment" is displayed as is shown in FIG. 9(*a*), or, since a confirmation screen for carrying out "color registration adjustment" is displayed as is shown in FIG. 9(*b*), the initial adjustment process is executed when the "Start" button 223 is pressed in the respective confirmation screens. Concrete examples of initial adjustment processes are discussed later.

Figure 10:
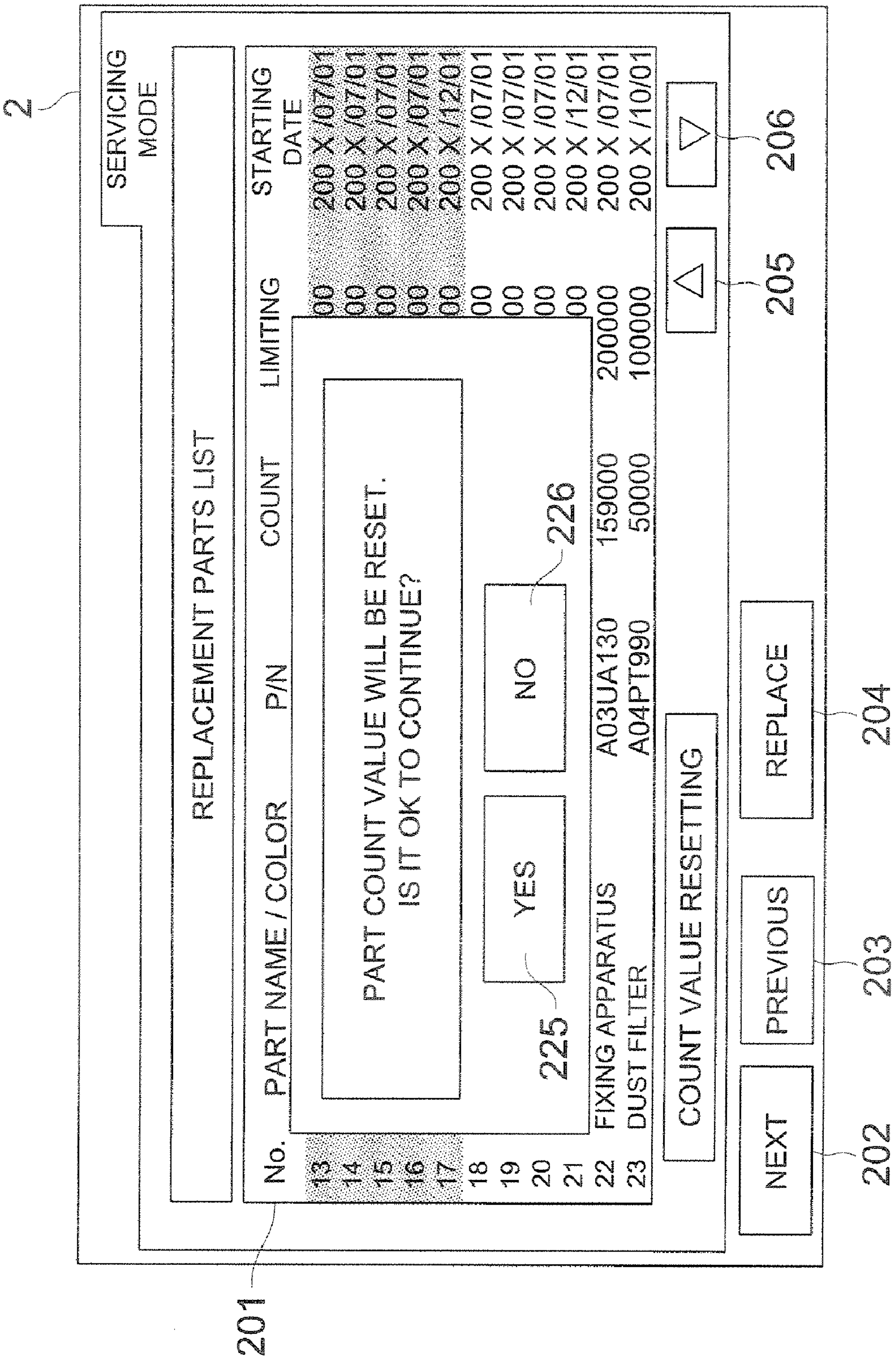
FIG. 10 is an example of displaying the confirmation screen for carrying out resetting of the part count value in the operation and display section 2.

At the point when Step S17 is completed, the replacement of all selected replacement parts and the associated initial adjustment processes are completed, and in Step S18, the parts count value of replaced parts is reset. FIG. 10 is an example of displaying the confirmation screen for carrying out resetting of the part count value in the operation and display section 2, and resetting the value of the replacement parts count is executed when the "Yes" button in this screen is pressed (END).

However, although an example was explained above in which the resetting of the parts count value in Step S18 was executed after the initial adjustment process (Step S17), it is not necessary to restrict to this and it is possible to execute the resetting of the parts count value immediately after detecting the end of replacement (Step S15).

In this manner, upon giving the input instruction of said replacement parts to be replaced in the operation and display section, by displaying the replacement procedure related to those replacement parts in the operation and display section and by carrying out ON/OFF control of the power supply to the power supply section, it is possible to provide an image forming apparatus in which it is possible to replace the parts easily. Because of this, it becomes possible for the user to carry out replacement of parts, and hence, it is possible to reduce the running cost.

[Initial Adjustment Process]

The initial adjustment process (initial process) differs for each replacement part as was mentioned earlier. The major replacement parts, the initial adjustment processes, and their procedures are given below. Replacement part—Drum cartridge: (1) Initial drum rotation adjustment, (2) color registration adjustment, (3) gamma adjustment (drum). Replacement part—Developing unit: (1) Toner density detection sensor automatic adjustment. Replacement part—Transfer belt unit: (1) Setting powder coating, (2) blade setting, (3) belt linear speed adjustment, (4) color registration adjustment.

Here, "Initial drum rotation adjustment" is the process of coating the lubricant 414 on the surface of an unused photoreceptor drum. In order to protect the photoreceptor 41 and the photoreceptor cleaning member 412, while rotating the lubricant coating roller 413, the photoreceptor 41 is rotated at a slow speed of about ⅓$^{rd}$ the normal rotational speed for a period of several seconds to several tens of seconds.

"Color registration adjustment" is adjusting the dot formation position between different colors by reading out the detection patterns formed on the photoreceptor drums 41 by the registration sensors as has been explained earlier.

A non contacting type potential detection sensor is provided at the middle point between the charging electrode 411 and the development roller 405 at a position opposite the surface of the photoreceptor 41 (not shown in the figure). "Gamma adjustment (drum)" is that of measuring the charging potential of the surface of the photoreceptor 41 and the potential after exposure using this potential sensor, and based on the result of this measurement, setting the output of the development bias so that a prescribed developing electric field is present (the difference between the development bias and the potential after exposure).

"Toner density detection sensor automatic adjustment" is that of measuring the toner density detection sensor 401 the magnetic permeability of the unused developing agent when the toner density inside the developing device 40 is at a prescribed value (the mass mixing ratio of the carrier to the toner in the developing agent), taking that measured value as the reference value of magnetic permeability and storing it in the storage section. Thereafter, adjustment of the toner density is made based on this reference value of magnetic permeability.

"Setting powder coating" is that of getting ready in advance a small bag having fine particles with a high smoothness as the setting powder, and the setting powder is coated by the user tapping this small bag lightly on the intermediate image transfer belt 42.

"Blade setting" is that of forming a band of toner on the intermediate image transfer belt 42 and cleaning it using the belt cleaning section 420 thereby making the toner get adhered to the tip of the cleaning blade. "Setting powder coating" and "Blade setting" are both carried out to protect the intermediate image transfer belt 42 and the cleaning blade of the belt cleaning section 420.

"Belt linear speed adjustment" is that of carrying out the adjustment of the rotational speed of the driving motor that is driving the intermediate image transfer belt 42 by measuring the interval of the images formed at a prescribed timing. The measurement of the interval between images is made by measuring using a scale the interval between images formed on a sheet.

The above is the explanations related to the initial adjustment processes for the major replacement parts. It is also possible to replace the fixing apparatus 10 and the image writing section 3 as other replacement parts.

What is claimed is:

1. An image forming apparatus, comprising:

a replacement part that can be replaced;

an operation and display section enabling an operator to select the replacement part;

an image forming section that forms an image on a sheet;

a power supply section that supplies power to said image forming section;

a storage section that stores a procedure of replacing said replacement part; and a control section, wherein the replacement part is selected from the group consisting of a photoreceptor cartridge having a photoreceptor for forming a latent image thereon, a charger that charges the photoreceptor of the photoreceptor cartridge, a development section that develops the latent image on the photoreceptor, a transfer belt unit that transfers a toner image obtained by developing the latent image with the development section, a fixing apparatus, and a dust filter, and wherein said control section carries out, upon an input instruction of said replacement part to be replaced from said operation and display section, a display operation of the replacement procedure of said replacement part on said operation and display section and an ON/OFF control of said power supply section.

2. The image forming apparatus according to claim 1, wherein said control section comprises a judging section, and wherein when the judging section judges that replacement of the part to be replaced has been completed, said control section carries out ON control of said power supply section and an initial adjustment process accompanied with the replacement of the part to be replaced.

3. The image forming apparatus according to claim 2, further comprising:

a door that opens and closes accompanied with the replacement of the part to be replaced; and a sensor that detects open and close of the door, wherein when the judging section judges that replacement of the part to be replaced has been completed, the judging section judges based on at least one of a detection of the close of the door by the sensor or an input operation to said operation and display section.

4. The image forming apparatus according to claim 1, wherein said control section carries out the ON/OFF control of said power supply section according to the selected replacement part.

* * * * *